United States Patent [19]
McBay et al.

[11] Patent Number: 5,862,448
[45] Date of Patent: Jan. 19, 1999

[54] DEVICE FOR THE SYNTHESIS OF DIMERIC SPECIES

[76] Inventors: Henry Ransom Cecil McBay, deceased, late of Atlanta, Ga.; by Ronald Patrick William McBay, legal representative, 2889 Seven Pines La., Atlanta, Ga. 30339-5801

[21] Appl. No.: 639,206

[22] Filed: Apr. 26, 1996

(Under 37 CFR 1.47)

[51] Int. Cl.$^6$ ..................................................... B01J 19/08
[52] U.S. Cl. ..................................... 422/186.3; 204/157.6
[58] Field of Search ................................... 585/250, 255, 585/709; 422/186.3, 186, 186.04, 186.21, 186.22; 204/157.6, 157.63, 275, 277, 278, 164, 165; 250/432 R, 435

[56] References Cited

U.S. PATENT DOCUMENTS

| | | | |
|---|---|---|---|
| 4,087,342 | 5/1978 | Bloomfield | 204/157.69 |
| 5,104,503 | 4/1992 | Crabtree et al. | 204/157.6 |
| 5,560,890 | 10/1996 | Berman et al. | 422/186.04 |

*Primary Examiner*—Kathryn L. Gorgos
*Assistant Examiner*—Alex Noguerola

*Attorney, Agent, or Firm*—Paul H. Ware; Walter Unterberg

[57] ABSTRACT

A compact, continuous-flow synthesis device for the production of dimeric hydrocarbon species by reacting unsaturated hydrocarbons such as alkenes and alkynes with atomic hydrogen or free radicals generated by the dissociation of molecular hydrogen or organics such as alkanes. The dissociation is carried out in a module either by the electric discharge between a pair of parallel, annular, flat disc, high-voltage electrodes or by the radiation between a pair of parallel, toroidal ultraviolet lamps. The reactant to be dissociated flows radially inward from the module periphery between the pair of electrodes or the pair of ultraviolet lamps, and reaches the axis of the annulus or torus in the dissociated state. Unsaturated hydrocarbons in the dispersed phase injected vertically down this axis react with the dissociated species in a collision chamber surrounding the dissociation module to form residual free radicals. Cooling the residual free radicals then converts them to condensed dimeric products in a collection basin adjacent to the collision chamber. Many dimeric species, such as 2,2,3,3-tetramethylbutane, can be produced from different starting materials. The device also generates dimeric products from the reaction of free radicals alone in the absence of unsaturated hydrocarbons.

4 Claims, 6 Drawing Sheets

DEVICE FOR THE SYNTHESIS OF DIMERIC SPECIES

TECHNICAL FIELD

This invention relates to the synthesis of dimeric organic species from unsaturated hydrocarbons. In particular, it relates to apparatus and method for reacting alkenes and alkynes with hydrogen atoms and free radicals to form dimeric products.

BACKGROUND INFORMATION

In the synthesis of dimeric species from the reaction of unsaturated hydrocarbons with hydrogen atoms or free radicals there are needed a supply of hydrogen atoms or free radicals and a reactor in which the reactants are properly combined.

Hydrogen atoms and free radicals can be created by the dissociation of molecular hydrogen and of suitable organic molecules. An example of an electromagnetic dissociation step is found in U.S. Pat. No. 4,374,288 granted to Robert L. Scragg for *Electromagnetic Process and Apparatus for Making Methanol*, issued Feb. 15, 1983. Here, molecular oxygen is passed between high-voltage plates thus creating an electrostatic field with sufficient heat generation to dissociate oxygen molecules into oxygen atoms. The latter are then combined with methane to produce methanol.

The state of a substance may be altered by means of a high-temperature arc discharge as shown in U.S. Pat. No. 3,720,598 granted to William A. Thompson for *Cryogenic Arc Furnace and Method of Forming Materials*, issued Mar. 13, 1973. Here, high-voltage capacitor plates are caused by mechanical shock to approach each other to bring about a high-temperature arc discharge across the substance of interest. The arc discharge vaporizes the substance which can then be rapidly quenched to an altered state. This type of process is not considered useful for dissociating the molecules used in the production of dimeric hydrocarbon species.

These prior art devices are commendable and show a creative spirit for their times. The inventors and their inventions have contributed remarkably to the technology involved. However, these prior art structures do not include those combined elements of the instant invention that provide greater facility of use and ingenious arrangement of components and that make the instant invention the high culmination in the art.

It is thus an object of the present invention to provide a compact, continuous-flow synthesis device in which unsaturated hydrocarbons are combined with atomic hydrogen or free radicals to produce dimeric species.

An additional object is to provide a synthesis device wherein the unsaturated hydrocarbons may be introduced in the liquid or gas phase.

Another object is to provide a synthesis device wherein free radicals react to form dimeric species in the absence of unsaturated hydrocarbons.

Still another object is to provide a synthesis device with temperature control of the reactants and of the reaction products to optimize the production of dimeric species.

SUMMARY OF INVENTION

To implement the stated objects of the invention, a compact continuous-flow synthesis device has been devised. The prominent feature of this device is a horizontal annular dissociation module through which molecular hydrogen gas or organics to be dissociated are introduced from around the module periphery in a radially inward direction.

The module may take the form of a pair of parallel, circular, flat-disc electrodes, preferably made of tungsten, located a small axial distance apart and connected to a high-voltage source to produce a silent electric discharge in the annular space between the electrodes. Alternatively, the module may take the form of a pair of toroidal, ultraviolet lamps, one filled with xenon gas and the other with mercury vapor, of substantially the same annular dimension and axial separation as the pair of electrodes. The effect of these lamps is to produce ultraviolet (UV) radiation in the annular space between the lamps.

Depending upon the module embodiment, the radially inward flowing hydrogen gas or organics are irradiated with either electromagnetic radiation or ultraviolet radiation as they pass across the annulus of the module between the pair of electrodes or lamps and are thereby dissociated to hydrogen atoms or organic free radicals. These dissociated species then continue to flow inward toward the axis of the module.

The unsaturated hydrocarbons are introduced above the dissociation module, flowing axially downward through a vertical inlet chamber to react with the radially inward flowing dissociation species at the level of the dissociation module.

The inlet chamber is surrounded by a pre-cooling chamber, typically using liquid nitrogen, which, in turn, is surrounded by a vacuum chamber. These components control the temperature of the incoming unsaturated hydrocarbons.

Further, a fritted disc of high porosity closes off the lower extremity of the inlet chamber and acts as an injector just above the dissociation module. If the hydrocarbons reaching the disc are gaseous, they will flow easily through the openings in the disc. If the hydrocarbons are liquid, they will be dispersed by the disc openings analogous to a shower head.

The dissociation module is located at the upper portion of a circular collision chamber which extends downward to provide residence time for the down-flowing reacting hydrocarbons and dissociation species to complete the reaction. The initial reaction products are residual free radicals.

The residual free radicals flow downward through the collision chamber outflow port into a conical collecting basin. Both the collision chamber and collection chamber are surrounded by a product cooling chamber. This cooling chamber is used to cool the space just below the collision chamber to below the "inversion temperature" for the particular residual free radical so that it will dimerize. The collecting basin collects the dimeric products and has an outlet to connect to any subsequent processing step.

This synthesis device can produce dimeric products from a variety of reactants such as:

1. unsaturated hydrocarbons (alkenes, alkynes) reacting with monatomic hydrogen from the dissociation of hydrogen gas;
2. unsaturated hydrocarbons (alkenes, alkynes) reacting with a free radical , e.g. a methyl free radical, from dissociation of an organic, e.g. azomethane; and
3. Free radicals from the dissociation of organics, e.g. alkanes, undergoing reaction alone in the absence of unsaturated hydrocarbons, i.e., without use of the hydrocarbon inlet chamber.

Thus, this continuous-flow synthesis device has the broad capability of reacting hydrogen atoms or any other free radicals which may be generated by electric discharge or ultraviolet irradiation of substrate gases or liquids entrained in an inert gas such a argon, with any and all alkenes or alkynes, either gaseous or liquid, to form residual free radicals which can be cooled to undergo further reactions to form dimeric products.

BRIEF DESCRIPTION OF DRAWINGS

Further advantages and features of the instant invention will be more fully apparent to those skilled in the art to which the invention pertains from the ensuing detailed description thereof, regarded in conjunction with the accompanying drawings wherein like reference numerals refer to like parts throughout and in which.

while Table X expresses these reactions in words.

DETAILED DESCRIPTION OF THE INVENTION

Figure 1:
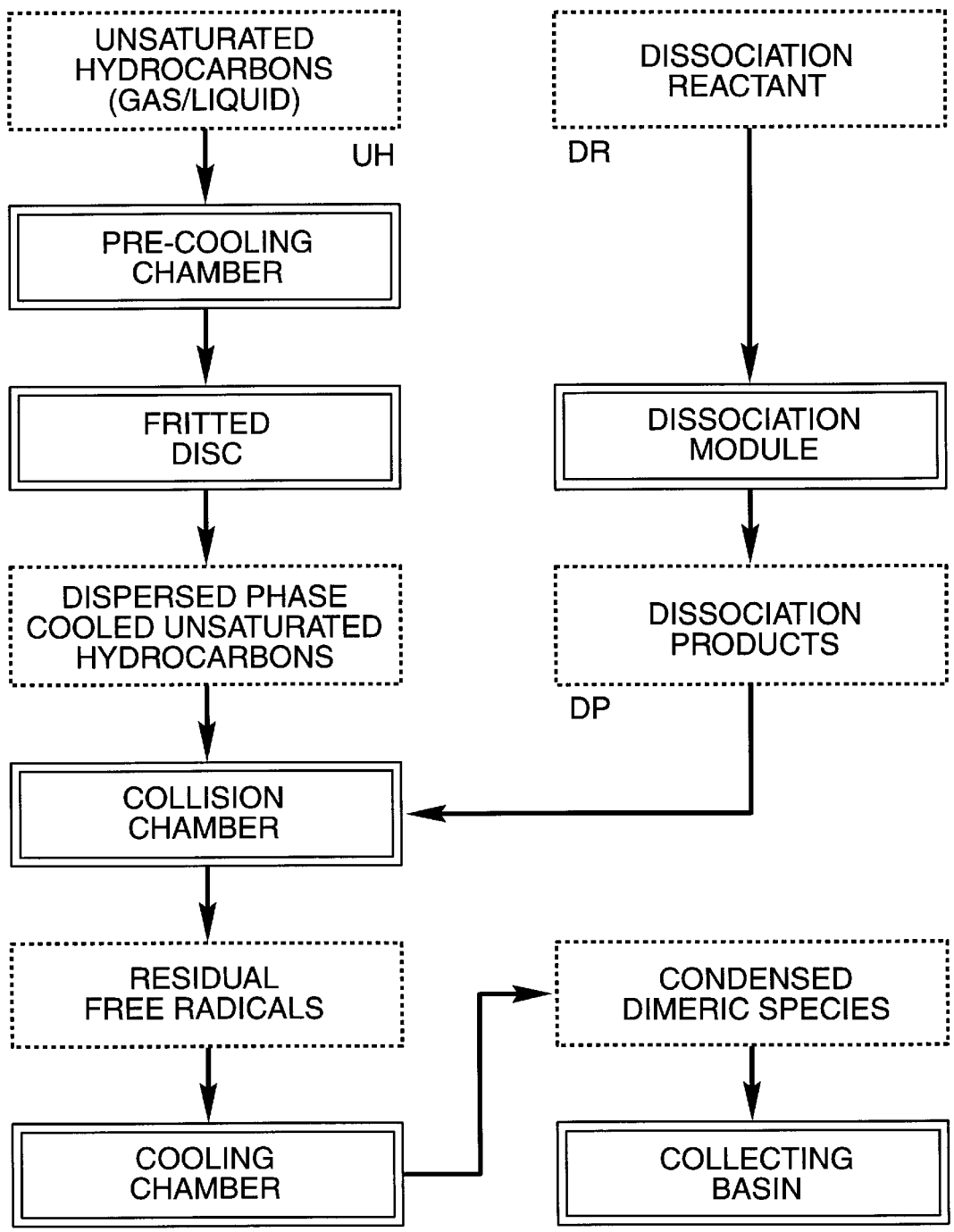
FIG. 1 is a flow diagram of the continuous-flow dimeric synthesis system.

Referring to FIG. 1, a schematic diagram of the continuous-flow dimeric synthesis system is shown. Solid boxes designate hardware and dashed boxes designate reactants and products. Unsaturated cooled hydrocarbons descend in the dispersed phase and react with dissociation products from the dissociation module in the collision chamber. The resulting residual free radicals are cooled to form condensed dimeric species which flow into the collecting basin.

Figure 2:
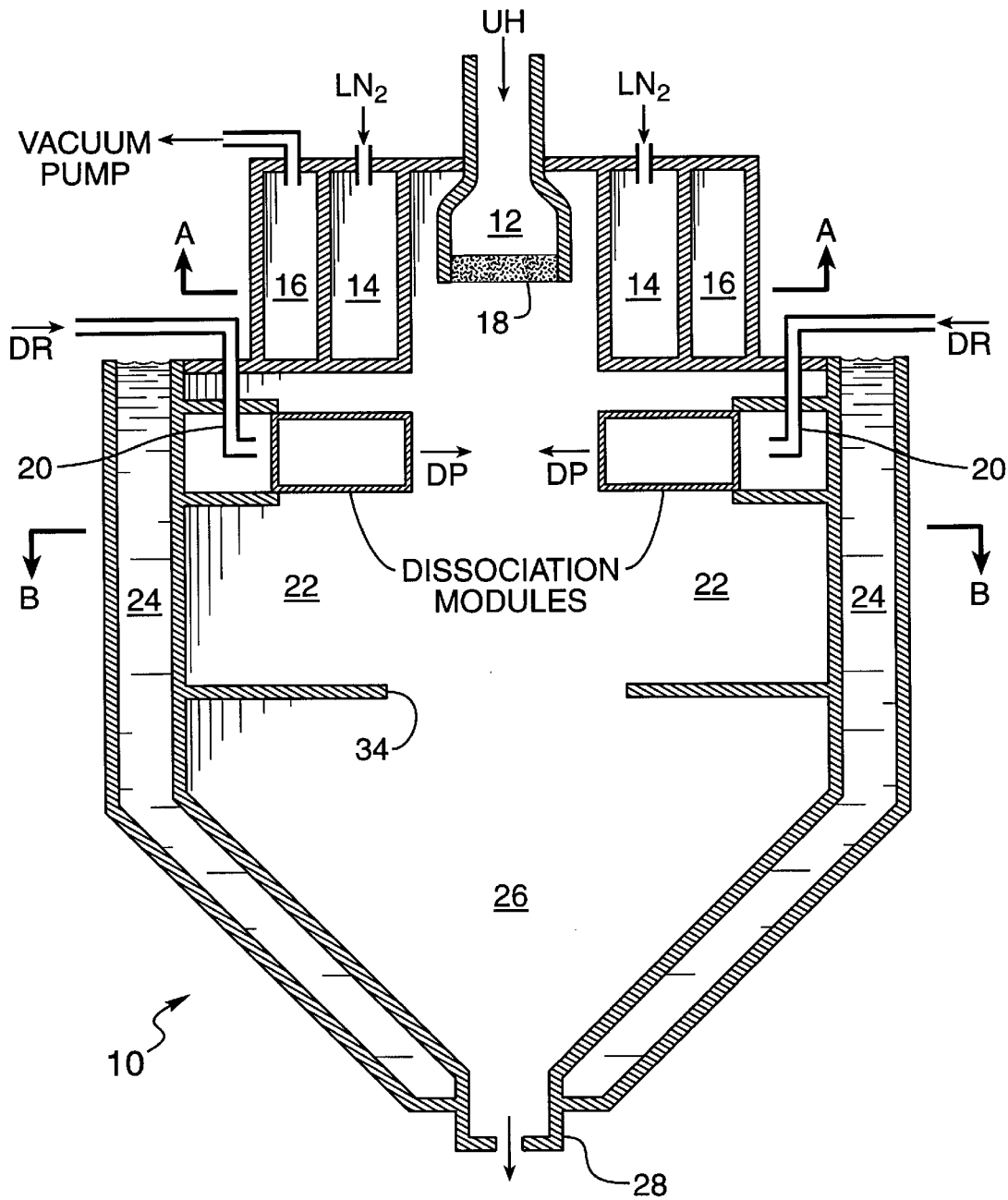
FIG. 2 is a sectional elevation of the dimeric synthesis device.
Figure 2A:
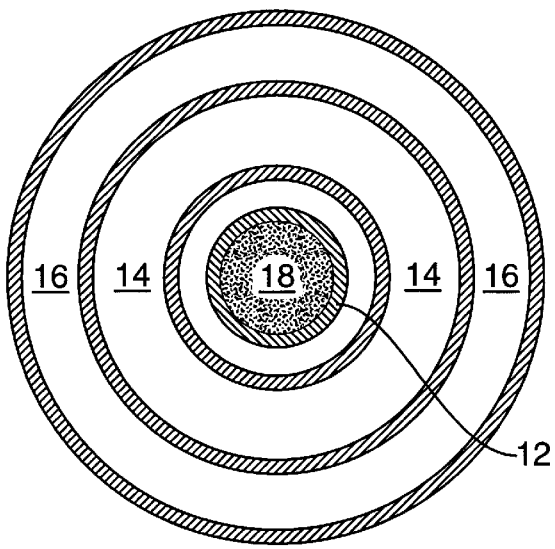
FIG. 2A is section A—A of the device, taken horizontally across the hydrocarbon inlet assembly looking upward.
Figure 2B:
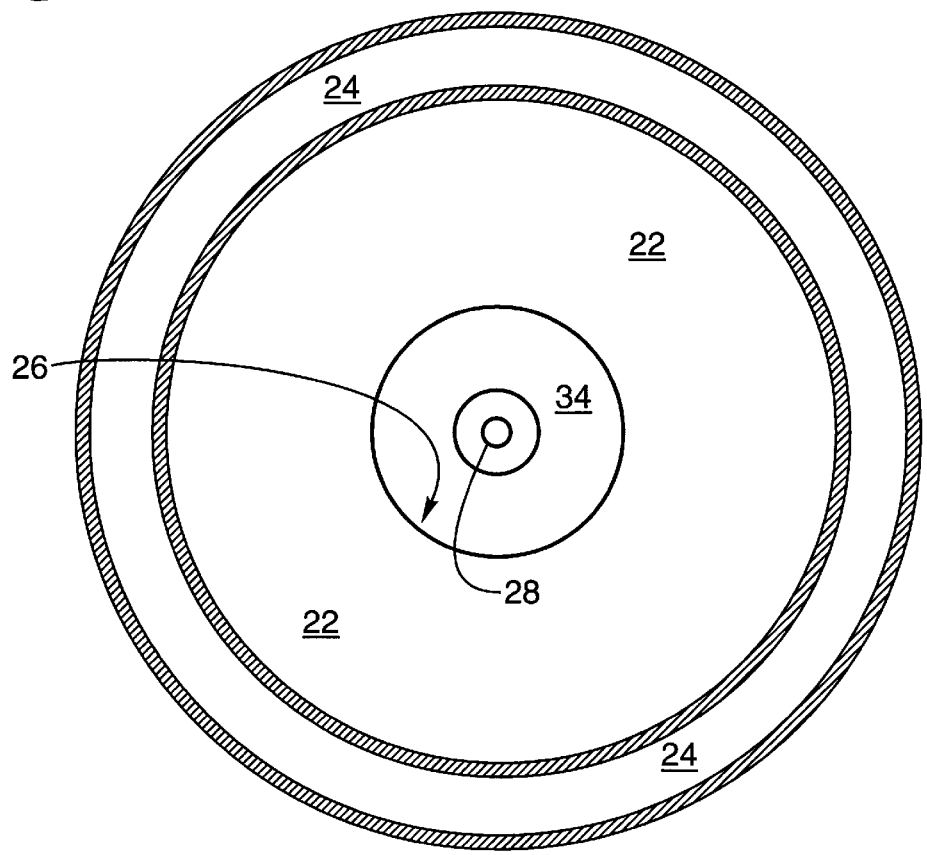
FIG. 2B is section B—B of the device, taken horizontally across the collision chamber and product cooling chamber looking downward.

Referring to FIG. 2, a sectional elevation of the dimeric synthesis device 10 is shown. Unsaturated hydrocarbons (UH) are introduced into vertical inlet chamber 12 from above and flow downward, exiting through high-porosity fritted disc 18. Hydrocarbon pre-cooling chamber 14, surrounded by vacuum chamber 16, uses liquid nitrogen (LN2) coolant to control the temperature of the exiting unsaturated hydrocarbons. Fritted disc 18 acts as an injector of gaseous or dispersed liquid phase hydrocarbons, depending on the nature of the hydrocarbons and the amount of cooling. Horizontal section A—A indicates the circular symmetry of the hydrocarbon inlet assembly comprising elements 12, 14, 16 and 18 as described above. The hydrocarbons are injected by disc 18 downward along the vertical axis of synthesis device 10 into the center of the upper portion of circular collision chamber 22.

Figure 3B:
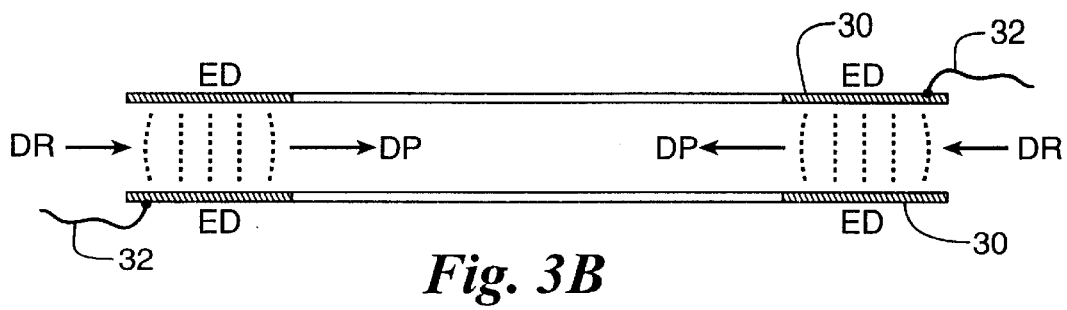
FIG. 3 is a plan view of the annular flat disc electrode dissociation module with sectional elevation C—C.
Figure 3A:
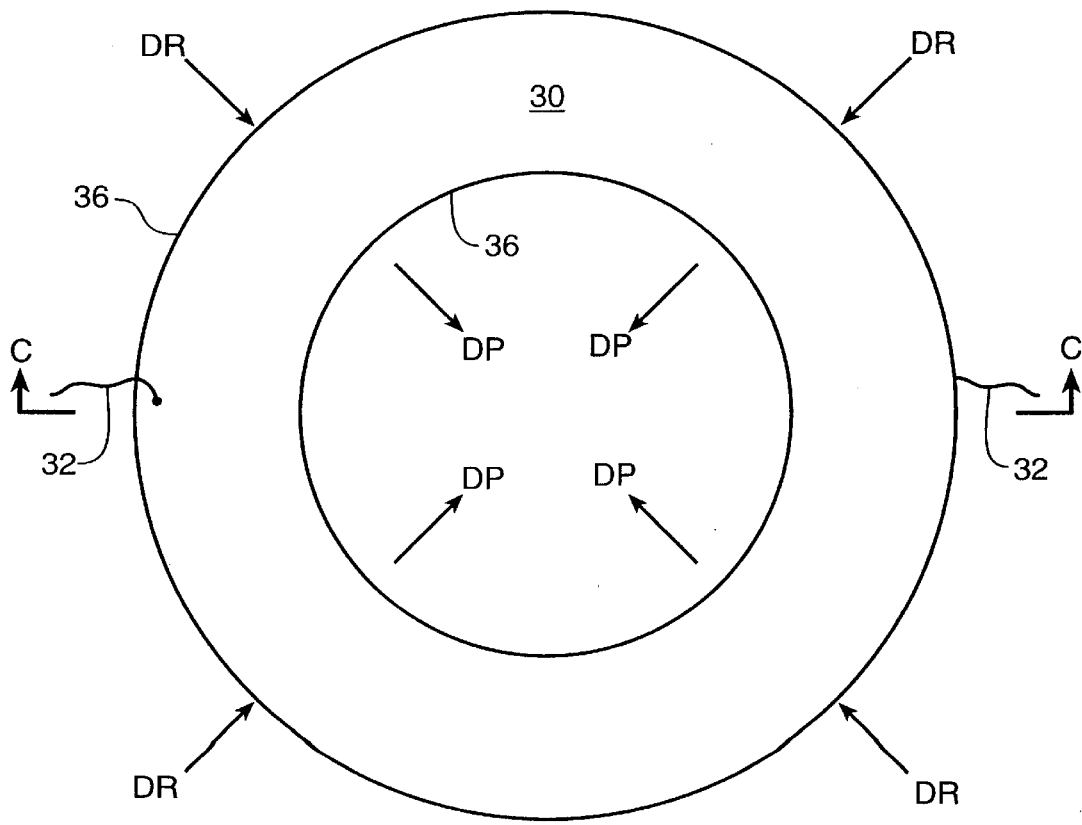
Figure 4B:
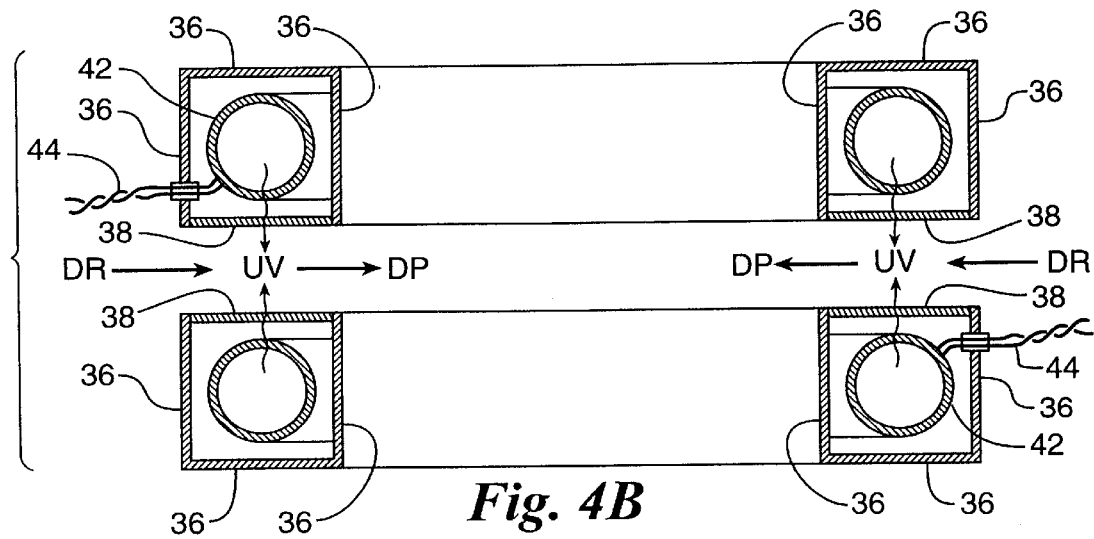
FIG. 4 is a plan view of the ultraviolet lamp dissociation module with sectional elevation D—D.
Figure 4A:
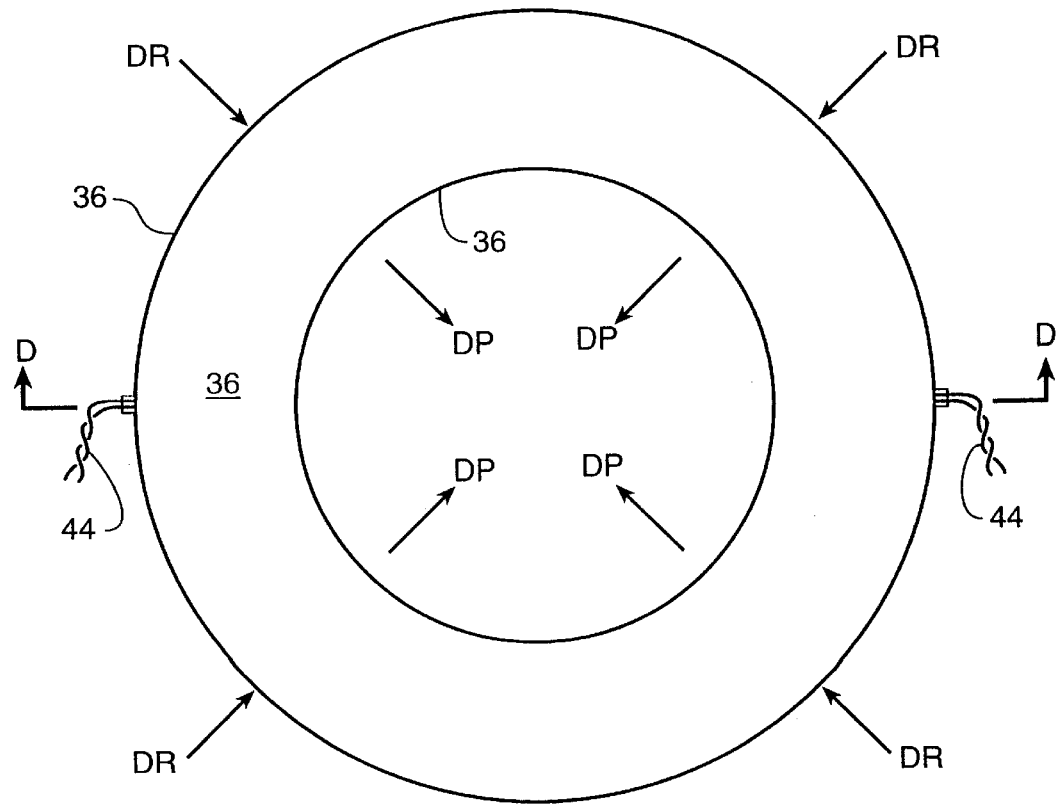
Figure 5:
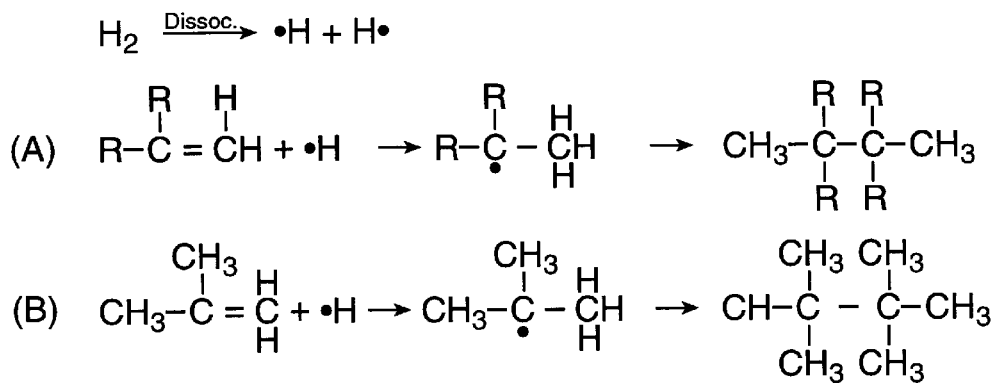
FIGS. 5–8 are the reactions with various reactants resulting in dimeric products expressed in chemical symbols.
Figure 6:
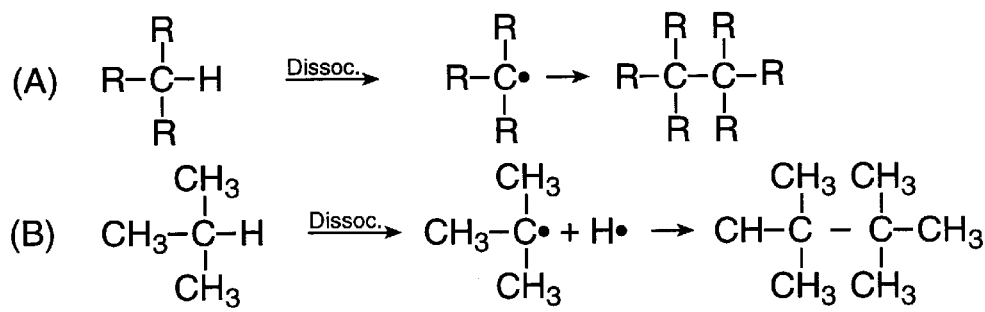

A horizontal annular dissociation module, whose detailed structure appears in FIG. 3 and FIG. 4, is located in the central upper portion of collision chamber 22. Dissociation reactants (DR) are introduced through a plurality of suitable dissociation reactant inlet ports 20 all along the periphery radially inward toward the center of the annular dissociation module. As they pass through this module, the dissociation reactants are irradiated by electromagnetic radiation which causes them to dissociate, e.g., molecular hydrogen is atomized into hydrogen atoms. The dissociation products (DP) continue to flow radially inward to the module center which lies on the central axis and to react with the hydrocarbons injected from above by disc 18.

The reacting substances descend vertically through collision chamber 22 whose vertical extent along with the size of collision chamber outflow port 34 are designed to provide sufficient residence time for the reaction to produce residual free radicals. Further, collision chamber 22 is surrounded by product cooling chamber 24 to reduce the temperature just below the collision chamber to below the "inversion temperature" for the particular free radicals so that they will condense and dimerize. These dimeric products move through outflow port 34 into a conical collecting basin 26 with an outlet 28 to connect to any subsequent process step. Horizontal section B—B, looking downward, indicates the circular symmetry of elements 22, 24 26 and 34 as described above.

Referring to FIG. 3, one of the dissociation module configurations is shown in plan view and in sectional elevation C—C. This module comprises a pair of parallel spaced apart annular flat disc electrodes 30 which are connected to a high-voltage source by electrode leads 32. The electrodes 30 are usually made of tungsten and when energized by high voltage they produce silent electric discharges (ED) on section C—C across the annular gap between them.

When dissociation reactants (DR) in FIGS. 1, 2, and 3, are introduced along a radially inward direction from the periphery through a plurality of inlet ports 20, FIG. 2, into the annular gap between electrodes 30, they dissociate to dissociation products DP, FIGS. 1, 2, and 3. These dissociation products continue their radially inward travel toward the vertical module axis where they encounter and start to react with unsaturated hydrocarbons flowing downward along the axis. Alternatively, in the absence of unsaturated hydrocarbons, the dissociation products can react alone to form residual free radicals and ultimately, dimeric species.

Referring to FIG. 4, the second dissociation module configuration is shown in plan view and sectional elevation D—D. This comprises a pair of parallel, spaced-apart, toroidal ultraviolet (UV) lamps 40 and 42, connected to electrical power sources by lamp leads 44. Lamp 40 contains xenon gas and lamp 42 contains mercury vapor. Together lamps 40 and 42 produce ultraviolet radiation in the annular gap between them. The dimensions of the annular gap in FIG. 4 and section D—D are the same as those in FIG. 3 and section C—C, so both modules are interchangeable. To concentrate the ultraviolet radiation into the annular gap, lamps 40 and 42 are each provided with an ultraviolet-reflecting annular enclosure 36 having a channel cross section equivalent to three sides of a square. The fourth side of the square faces the annular gap and is an annular ultraviolet-transparent plate 38 secured in a light-tight manner to enclose 36. Normally, enclosure 36 is made of metal and plate 38 of plastic. Dissociation occurring in the ultraviolet lamp module configuration takes place in a similar manner as that in the electrode module configuration.

One laboratory realization of the dimeric synthesis device built according to this invention has the following dimensions:

| Dissociation Module- | Inches |
|---|---|
| Annulus inner diameter | 3.0 |
| Radial annular width | 1.0 |
| Axial distance between Pairs of electrodes/lamps | 0.5 |
| Hydrocarbon Inlet Chamber- | |
| Vertical length | 14.0 |
| Inlet diameter | 0.6 |
| Fritted disc diameter | 2.25 |
| Fritted disc thickness | 0.12 |
| Annular Pre-Cooling Chamber | |
| Inner diameter | 3.25 |
| Outer diameter | 7.25 |
| Vertical length | 14.0 |
| Annular Vacuum Chamber- | |
| Inner diameter | 7.5 |
| Outer diameter | 11.5 |
| Vertical length | 14.0 |
| Collision Chamber- | |
| Inside diameter | 7.5 |
| Vertical length | 8.0 |
| Outflow port diameter | 3.0 |
| Collecting Basin- | |
| Maximum inside diameter | 14.75 |
| Vertical length | 10.0 |
| Cooling Chamber- | |
| Width of annulus | 2.0 |

Table X lists reactions and products obtainable with the dimeric synthesis device.

TABLE X

Reactions and Products Obtainable with Dimeric Synthesis Device

| Ref. FIG. | Reactant | Product | Unsat. hydro-carbon | Residual free radical | Dimeric Species |
|---|---|---|---|---|---|
| 5A | hydrogen gas | mon-atomic hydrogen | alkenes alkynes | generic free radical | generic dimeric species |
| 5B | hydrogen gas | mon-atomic hydrogen | isobutene | methyl free radical | 2,2,3,3-tetra-methyl butane |
| 6A | alkanes | generic free radical | — | — | generic dimeric species |
| 6B | isobutane | tertiary butyl free radical | — | — | 2,2,3,3-tetra-methyl butane |
| 7 | isobutane | tertiary butyl free radical | isobutene | tertiary butyl free radical | 2,2,3,3-tetra-methyl butane |
| 8A | azo-methane | methyl free radical | alkenes alkynes | generic free radical | generic dimeric species |
| 8B | methyl iodide | methyl free radical | alkenes alkynes | generic free radical | generic dimeric species |

Referring jointly to FIGS. 5 through 8 and Table X, there are shown combinations of various reactants resulting in different dimeric species obtainable from the synthesis device. FIGS. 5–8 describe these reactions in terms of chemical symbols only whereas Table X, which is cued to these figures, gives the names of the reactants, free radicals and products.

FIG. 5A shows the generic reactions and products when a generic unsaturated hydrocarbon like an alkene or alkyne is reacted with monatomic hydrogen. FIG. 5B illustrates the specific case of isobutene which reacts with monatomic hydrogen to form a methyl free radical and ultimately the dimeric 2,2,3,3-tetramethylbutane.

FIG. 6A shows the generic reactions and products when alkanes are dissociated to form free radicals which react alone to form dimeric species in the absence of an unsaturated hydrocarbon. FIG. 6B illustrates the specific case of isobutane which dissociates to form a tertiary butyl free radical and ultimately forms the dimeric 2,2,3,3-tetramethylbutane.

Figure 7:
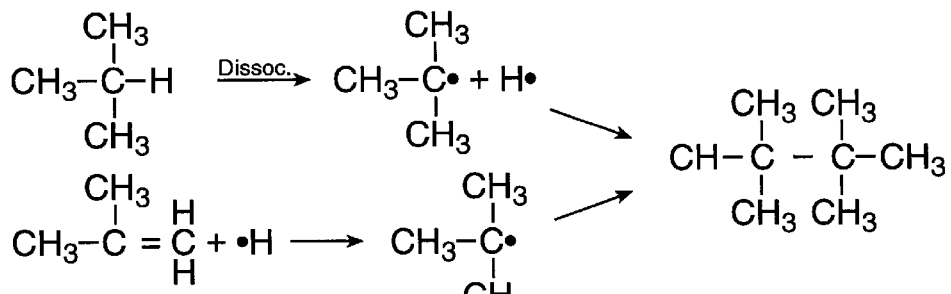
Figure 8:
Figure 8:
Figure 8:
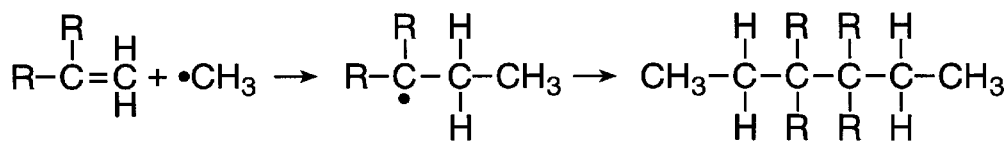

FIG. 7 shows the case when isobutane is dissociated to form a tertiary butyl free radical which reacts with the unsaturated hydrocarbon isobutene to form the dimeric 2,2,3,3-tetramethylbutane.

FIG. 8A shows how azomethane and FIG. 8B how methyl iodide are dissociated to form a methyl free radical which reacts with a generic unsaturated alkene or alkyne to form a generic dimeric species.

FIGS. 5 through 8 and Table X have illustrated the versatility of the continuous-flow synthesis device in accommodating a variety of reactants to form different dimeric products. Additional reactants and other realizations of the present invention are possible without departing from the spirit and scope of the invention as delineated in the appended claims.

INDUSTRIAL APPLICABILITY

The present invention finds application wherever the capability is required of reacting hydrogen atoms or any other free radicals which may be generated by electric discharge or by ultraviolet irradiation of substrate gases or liquids entrained in an inert gas such as argon with any and all alkenes or alkynes, either gaseous or liquid, to form residual free radicals which may undergo further reactions to form dimeric products or a variety of diverse products.

Abstract of the Drawings

In the drawings, the numbers refer to like parts and for the purpose of explication, set forth below are the numbered parts of the Device for the Synthesis of Dimeric Species of this invention.

| ID | Description of Element | In Fig |
|---|---|---|
| 10 | Dimeric Synthesis Device | 2 |
| 12 | Inlet Chamber | 2,2A |
| 14 | Hydrocarbon Pre-cooling Chamber | 2,2A |
| 16 | Vacuum Chamber | 2,2A |
| 18 | Fritted Disc | 2,2A |
| 20 | Dissociation Reactant Inlet Port | 2 |
| 22 | Collision Chamber | 2,2B |
| 24 | Product Cooling Chamber | 2,2B |
| 26 | Collecting Basin | 2,2B |
| 28 | Collecting Basin Outlet | 2,2B |
| 30 | Annular Flat Disc Electrode | 3 |
| 32 | Electrode Leads | 3 |
| 34 | Collision Chamber Outflow Port | 2B |
| 36 | Ultraviolet Reflecting Enclosure | 4 |
| 38 | Ultraviolet Transparent Plate | 4 |
| 40 | Toroidal Xenon Ultraviolet Lamp | 4 |
| 42 | Toroidal Mercury Vapor Ultraviolet Lamp | 4 |
| 44 | Ultraviolet Lamp Leads | 4 |

It is claimed:

1. In a continuous-flow chemical reaction synthesis device for synthesizing dimeric species comprising (a) a module for dissociating a reactant to a dissociation product, (b) a reactant inlet means for supplying the reactant to the module, (c) a hydrocarbon inlet chamber supplying unsaturated hydrocarbons to react with the dissociation product, (d) a collision chamber in proximity to the module and to said inlet chamber for receiving and reacting the dissociation product and the unsaturated hydrocarbons to form residual free radicals, (e) a temperature controls means for converting the residual free radicals to dimeric species, and (f) a collecting basin adjacent to the collision chamber for receiving the dimeric species:

the module centered about a central axis of the synthesis device and comprising a pair of horizontal, parallel, spaced-apart, electrically powered toroidal ultraviolet lamps, one lamp containing xenon gas and the other lamp containing mercury vapor, to produce ultraviolet radiation in an annular gap between the pair of lamps for the purpose of dissociating an incoming reactant, the module also comprising ultraviolet-reflecting enclosures around the outside and sides of the lamps to concentrate the ultraviolet radiation into the annular gap.

2. In a continuous-flow chemical reaction synthesis device for synthesizing dimeric species comprising (a) a module for dissociating a reactant to a reactant dissociation product centered about a central axis of the synthesis device and comprising a pair of horizontal, parallel, spaced-apart, electrically powered toroidal ultraviolet lamps, one lamp containing xenon gas and the other lamp containing mercury vapor, to produce ultraviolet radiation in an annular gap between the pair of lamps for the purpose of dissociating an incoming reactant, the module also comprising ultraviolet-reflecting enclosures around the outside and sides of the lamps to concentrate the ultraviolet radiation into the annular gap, (b) a reactant inlet means for supplying the reactant to the module, (c) a hydrocarbon inlet chamber supplying unsaturated hydrocarbons to react with the dissociation product, (d) a collision chamber in proximity to the module and to said inlet chamber for receiving and reacting the dissociation product and the unsaturated hydrocarbons to form residual free radicals, (e) a temperature control means for converting the residual free radicals to dimeric species, and (f) a collecting basin adjacent to the collision chamber for receiving the dimeric species:

the reactant inlet means comprising a plurality of reactant inlet ports spaced around a periphery of the pair of toroidal ultraviolet lamps and directed radially inward to discharge a reactant into the annular gap between the pair of lamps.

3. In a continuous-flow chemical reaction synthesis device for synthesizing dimeric species comprising (a) a module for dissociating a reactant to a dissociation product, (b) a reactant inlet means for supplying the reactant to the module, (c) a collision chamber in proximity to the module and to said inlet chamber for receiving and reacting the dissociation product to form residual free radicals, (d) a temperature control means for converting the residual free radicals to dimeric species, and (e) a collecting basin adjacent to the collision chamber for receiving the dimeric species:

the module centered about a central axis of the synthesis device and comprising a pair of horizontal, parallel, spaced-apart, electrically powered toroidal ultraviolet lamps, one lamp containing xenon gas and the other lamp containing mercury vapor, to produce ultraviolet radiation in an annular gap between the pair of lamps for the purpose of dissociating an incoming reactant, the module also comprising ultraviolet-reflecting enclosures around the outside and sides of the lamps to concentrate the ultraviolet radiation into the annular gap.

4. In a continuous-flow chemical reaction synthesis device for synthesizing dimeric species comprising (a) a module for dissociating a reactant to a reactant dissociation product centered about a central axis of the synthesis device and comprising a pair of horizontal, parallel, spaced-apart, electrically powered toroidal ultraviolet lamps, one lamp containing xenon gas and the other lamp containing mercury vapor, to produce ultraviolet radiation in an annular gap between the pair of lamps for the purpose of dissociating an incoming reactant, the module also comprising ultraviolet-reflecting enclosures around the outside and sides of the lamps to concentrate the ultraviolet radiation into the annular gap, (b) a reactant inlet means for supplying the reactant to the module, (c) a collision chamber in proximity to the module and to said inlet chamber for receiving and reacting the dissociation product to form residual free radicals, (d) a temperature control means for converting the residual free radicals to dimeric species and (e) a collecting basin adjacent to the collision chamber for receiving the dimeric species:

the reactant inlet means comprising a plurality of reactant inlet ports spaced around a periphery of the pair of toroidal ultraviolet lamps and directed radially inward to discharge a reactant into the annular gap.

* * * * *